United States Patent
Fradin

[11] Patent Number: 5,673,564
[45] Date of Patent: Oct. 7, 1997

[54] METHOD FOR PREPARING MEAT LOAVES AND THE LIKE, USEFUL FOR MAKING FLAKY MEAT LOAVES

[76] Inventor: Maurice Fradin, Résidence le Jean Bart—19 Esplanade de la Mer, 85160 Saint Jean de Monts, France

[21] Appl. No.: 513,809
[22] PCT Filed: Dec. 28, 1994
[86] PCT No.: PCT/FR94/01544
 § 371 Date: Aug. 29, 1995
 § 102(e) Date: Aug. 29, 1995
[87] PCT Pub. No.: WO95/17832
 PCT Pub. Date: Jul. 6, 1995

[30] Foreign Application Priority Data

Dec. 29, 1993 [FR] France .................. 93 16013

[51] Int. Cl.⁶ ........................................... F25D 13/06
[52] U.S. Cl. ............................ 62/63; 62/65; 62/320; 99/517; 426/524
[58] Field of Search ................. 62/63, 65, 320; 99/517; 426/524

[56] References Cited

U.S. PATENT DOCUMENTS

| | | | |
|---|---|---|---|
| 2,812,260 | 11/1957 | Keane, Sr. et al. | 99/194 |
| 4,060,998 | 12/1977 | Bernard | 62/320 |
| 4,072,763 | 2/1978 | Mart | 426/513 |
| 4,258,068 | 3/1981 | Huffman | 426/272 |

FOREIGN PATENT DOCUMENTS

| | | |
|---|---|---|
| 2683124 | of 0000 | France . |
| 2595039 | 9/1987 | France . |
| 2628607 | 9/1989 | France . |
| 9201003 | 1/1993 | France . |

*Primary Examiner*—Ronald C. Capossela
*Attorney, Agent, or Firm*—William A. Drucker

[57] ABSTRACT

The method of the invention comprises compression-forming prerefrigerated meat pieces into loaves, wherein the temperature of the loaves is brought, through successive stabilization operations, to a predetermined value. In this method, the meat pieces are individually subjected to a drying stage in a cold air stream (drying station) before undergoing an intense cooling stage (cooling station) followed by a stabilization stage. The invention is useful for instance for making flaky meat loaves.

16 Claims, 2 Drawing Sheets

METHOD FOR PREPARING MEAT LOAVES AND THE LIKE, USEFUL FOR MAKING FLAKY MEAT LOAVES

This invention relates to a method for preparing meat loaves or the like obtained by compression-forming of prerefrigerated meat pieces.

Further objects are a flaky meat production method including the production of said loaves, and the installations implementing said methods.

It is recalled that, by way of French patent application No. 92 01003, a method for producing flaky meat loaves has been proposed comprising the compression of previously refrigerated meat pieces into loaves or blocks in which the temperature of the meat is brought, through temperature stabilizing operations, to a value included between 0° and −6° C. and, preferably, between 0° and −2° C., the guided feeding of the loaves according to a predetermined axis and the cutting of the loaves into extra-thin slices. Once the slices have been cut, they are fed, by means of a transporter, to a forming station, irrespective of whether or not they have been sprayed with an appropriate binder.

The pieces from which the meat loaves are made arrive from a preparation station comprising peelers intended to remove the superficial skins covering the meat, and a cutting station in which the pieces are cut.

Experience has proved that the problem of cutting meat loaves into extra-thin slices is always poorly solved, notably due to the differences in consistency of the meat loaves, from one part to another of their volume, these differences in consistency being due notably to thermal heterogeneousness in the mass and to the presence of liquid elements between the pieces.

In this respect, the numerous experiments conducted show that, in order to achieve extra-thin slices without deteriorating the fibrous structure of the meat, the loaves must be perfectly homogeneous in terms of both consistency and thermal characteristics. In fact, the temperature of the blocks must necessarily be situated between 1° C. and −2° C. to obtain a consistency enabling slicing in good conditions.

However, in the method disclosed in the above-mentioned patent, the meat peeling and slicing operations performed within the context of the production of the pieces, causes the meat to ooze. As a result, during the subsequent refrigeration phase, there is formed on the perimeter of the meat a crust of ice which will subsequently constitute a thermal shield against thermal homogenizing of the meat. Moreover, this presence of liquid leads to a modification of the outer appearance of the pieces whose surface takes on a bluish hue. Furthermore, the presence of pockets of liquid between the pieces has, at the time of slicing, the previously mentioned drawbacks.

The aim of the invention is therefore more particularly to remedy these disadvantages.

Accordingly, there is provided a preparation method comprising, prior to the loaf compression-forming phase, the following successive stages:

a drying stage during which the meat pieces are individually subjected to a stream of cold air at a temperature included between −10° C. and −30° C., an intense cooling stage during which the previously dried pieces are subjected to an atmosphere brought to a temperature of the order of −25° C. to −45° C. generated either by the injection of dry ice or by a mechanical type refrigeration system, a thermal stabilizing stage during which the cold, which is initially concentrated on the perimeter of the pieces, spreads into the mass until the overall temperature settles at between −0.5° C. and 1.5° C., a phase of transfer of the pieces to the forming station, this transfer taking place in suitable conditions so as to avoid any phenomenon of condensation or oxidizing of the meat.

By way of these dispositions, the pieces obtained at the entrance to the forming station have a relatively dry outer surface and a homogeneous temperature at the level best suited to compression-forming.

The homogenizing of the temperature then continues during the forming due to the fact that the temperature generated by the compression of the pieces is offset by the slight variance in temperature still subsisting in the peripheral layers of the meat.

Advantageously, the forming station can comprise a hopper feeding into the supply chamber of a tubular mould in which slides a pusher activated by a jack, in order to compress a quantity of meat suitable to the obtaining of a loaf.

This forming station can further comprise a magazine, e.g. of the barrel type, in which the loaves compressed in the mould are successively arranged prior to moving to the slicing station.

The flaky slices of meat obtained by the slicing can be mixed with a binder and ingredients and then be transmitted to a vacuum compacter/extruder e.g. with a double helicoidal screw, which causes a texturizing of the meat. Upon leaving this compacter/extruder, the product can be cut into pieces of the required size and packed in a known manner.

An embodiment of a flaking installation implementing the method according to the invention will be described hereinunder, by way of a non-limiting example, in reference to the corresponding accompanying drawings in which:

FIG. 1a is a synoptic diagram of the flaking line;

FIG. 1b is a detailed lateral view of conveyor belts supplying pieces of meat to the meat peeling and cutting stations shown in FIG. 1a;

FIG. 1c is a detailed view of distributors spraying a binder and ingredients in the meat flakes obtained at the slicing station shown in FIG. 1a;

Figure 1:
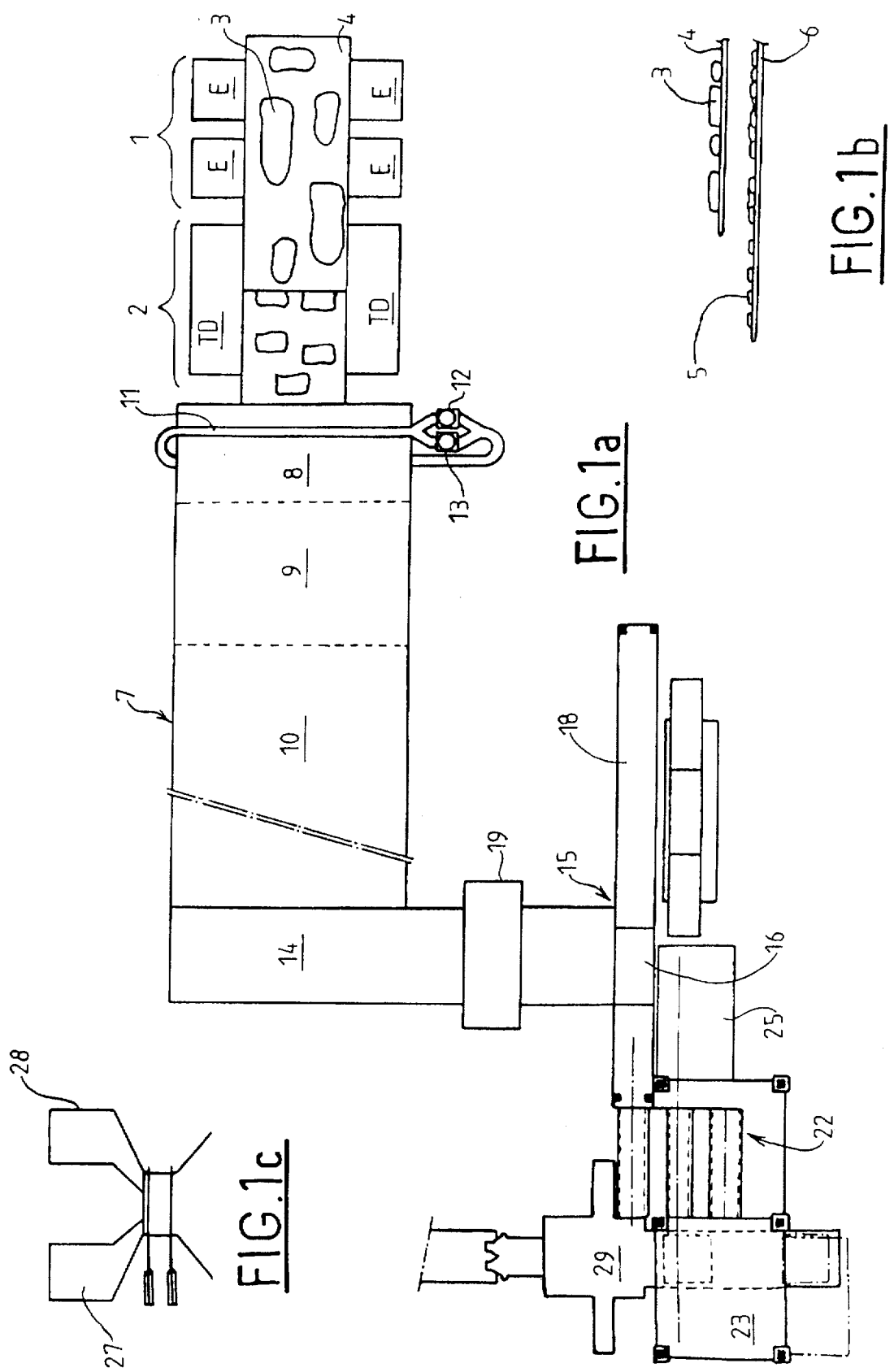
Figure 2:
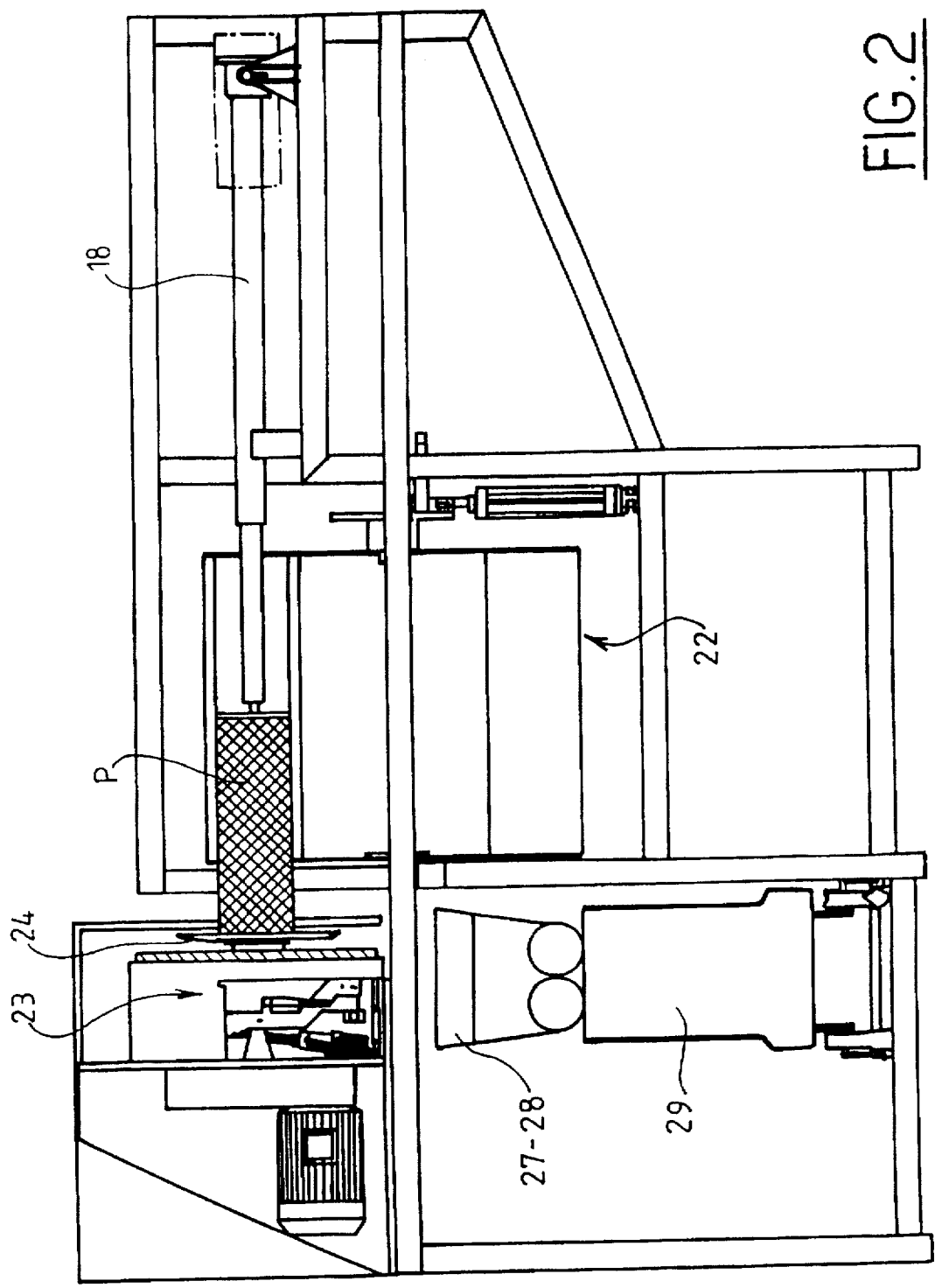
FIG. 2 is a front view of the installation enabling the loaf magazine and slicing station to be shown.

In the example represented in FIG. 1a, the installation firstly comprises a peeling station 1 and a station 2 for cutting the pieces of meat 3 which are supplied by a first conveyor belt 4. In this example, the peelers E and the cutting tables TD are arranged laterally, on both sides of the conveyor 4.

Once they have been cut, the pieces 5, which then have a thickness of the order of 15 to 30 mm and an area of approximately 30 cm$^2$, are arranged on a second conveyor 6 of which the belt is open-worked (e.g. in the shape of a mesh net).

This second conveyor 6, which fits partially below the first conveyor 4, circulates in a tunnel 7 successively comprising a drying station 8, an intense cooling station 9 and a temperature stabilizing station 10 (FIG. 1b).

The drying station 8 comprises a means for forced circulation of a gas, e.g. air at a temperature of −10° C. to −30° C., which generates inside the tunnel 7 an air stream angled perpendicularly to the axis of flow of the conveyor 6.

The circuit 11 recycling this air stream is equipped with a de-icing battery comprising two heat exchangers 12, 13 which operate alternately.

By way of the action of this cold air stream, the meat pieces 5 arranged separately from one another on this belt 6, without overlapping, undergo drying over their entire area (including the side lying on the conveyor belt 6 due to the mesh structure of the latter).

Furthermore, the surface cooling of these pieces 5 is carried out homogeneously on all sides.

The duration of this drying stage, and therefore the speed of the belt 6 and length of the drying area depend, of course, on the speed and temperature of the air stream.

At the outlet from the drying station 8, the pieces 5 enter the cooling station 9 where they are subjected to intense superficial cooling in an atmosphere brought to a temperature of the order of −25° C. to −45° C. Inside this station is created, on the surface of the pieces, a dry film frozen at a low temperature. The cold can be generated in this instance by a mechanical means or by dry ice.

The pieces 5 are then brought to the stabilizing station 10 in which the gas atmosphere is brought to a temperature of the order of −15° C. to −25° C.

This stabilizing station 10 has the effect of bringing the internal temperature of the pieces to a value of the order of −0.1° C. to 1.5° C. by calorie absorption by the peripheral frozen film which remains nonetheless at a relatively low temperature.

The pieces are then discharged onto a lift conveyor 14 which transfers them into a hopper 15 feeding a loaf-forming mould 16 fitted with a hydraulic jack 18.

During this transfer, the thermal homogenizing of the pieces 5 continues until the obtaining of a temperature that is ideal for shaping while ensuring a surface condition devoid of any oozing.

The lift conveyor 14 is advantageously of the type with a conveying belt circulating in an atmosphere of carbon anhydride.

A detector of metal particles 19 causes the meat feeding to stop in the presence of a metal body in a piece 5 transported by the conveyor 14.

The meat loaf forming mould 16, which is mounted on a frame, is closed, at its end opposite the pusher ending the piston of the jack 18, by a flap of which the opening and closing are controlled by a jack.

The controlling of the jack 18 is performed in such a way that the loaf formed between the pusher and the flap will be of predetermined length. To this end, after having compressed a certain quantity of meat inside the mould 15, the jack 18 goes back a length equal to twice the unfilled length of the mould, whereby with the successive to-and-fro movements of the jack performed to obtain a complete filling of the mould, decreasing fractions of quantities of meat contained in the hopper 15 are pushed into the mould.

This mode of operation has the advantage of obtaining a complete and homogeneous filling of the mould 16 without having to leave large quantities of meat upstream of the forming station when the installation is stopped.

When it has been formed, each loaf P is pushed by the jack 18 into a housing in a barrel-type magazine 22 driven in rotation and which successively presents the loaves to a slicing station 23.

The period of dwell of the loaves P in the magazine 22 is determined so that the temperature of the meat has the time to stabilize itself at a value included between 0° C. and −2° C., allowing for the fact that the compression of the pieces 5 generates a rising of the temperature offset by the superficial layer of the pieces of which the temperature remained lower.

The station 23 slicing the loaves P into extra-thin flaky slices uses a pressing element that retains the loaves P with a view to slicing them and a cutting head 24 housed in a protective casing.

The cutting head 24 can advantageously comprise two slicing disks mounted on a circular plate driven in rotation about its axis by a motor.

These disks are themselves driven in rotation about their respective axes by two motors.

In normal operation, the blades alternately cut into the loaf P without the latter coming into contact with the face plates.

This cutting by rotating slicing disk, without a reference bearing plane, avoids the friction constraints that would have the effect of deteriorating the texture of the flakes.

Under the effect of a pusher 25, the end of the loaf advances by sliding into the presser which prevents the meat from being partially torn by the blade.

The meat flakes obtained at the slicing station 23 are subjected to the spraying of a binder and ingredients coming from respective distributors 27, 28 (FIG. 1c).

They are then inserted into a vacuum compacting device 29 e.g. of the type described in French patent application No. 91 13610 using an extruder with helicoidal screws arranged so as to ensure a continuous vacuum throughout the compacting and extruding process. Advantageously, the helicoidal screws used in this compacting device 29 will be heated by induction by means of an alternating magnetic field generated outside the endless screw. Such an arrangement is notably aimed at reducing friction between the screw and the flaky slices of meat and at preventing any glueing of these flaky slices to the metal of the screws.

At the outlet of the compacting device/extruder 29, the column-shaped product can be sliced and packed in a manner suitable to sale thereof, as a fresh product or in the form of a frozen product.

I claim:

1. A method for preparing meat loaves of the type comprising compression-forming previously refrigerated meat pieces to form loaves in which temperature is brought through temperature stabilizing operations to a predetermined value, said method comprising, prior to the loaf compression-forming phase, the successive steps of:

drying individually the meat pieces by applying to them a stream of cold air at a temperature included between −10° C. and −30° C., intensely cooling the previously dried pieces by placing them in an atmosphere brought to a temperature included between −25° C. to −45° C. generated either by the injection of dry ice or by a mechanical type refrigeration system, thermally stabilizing the previously cooled meat pieces for spreading into the meat pieces the cold which is initially concentrated on the perimeter thereof until the overall temperature thereof settles at between −0.5° C. and 1.5° C., transferring the previously thermally stabilized meat pieces to a compression-forming station in an atmosphere preventing any phenomenon of condensation or oxidizing of the meat pieces.

2. The method as claimed in claim 1, wherein thermal stabilization of the meat pieces continues during the compression-forming phase due to the fact that the temperature generated by the compression of the meat pieces is offset by a slight variance in temperature still subsisting in the peripheral layers of the meat pieces.

3. The method as claimed in claim 1, wherein said drying is performed in a tunnel of transfer of the meat pieces by forced circulation of a gas current brought to a temperature of −10° C. to −30° C., angled perpendicularly to the axis of transfer of the meat pieces in said tunnel.

4. The method as claimed in claim 3, further comprising de-icing of said gas current by means of two heat exchangers which operate alternately.

5. The method as claimed in claim 1, wherein during drying, the meat pieces are borne by an open-worked support.

6. The method as claimed in claim 1, wherein the intense cooling of the meat pieces is ensured by an atmosphere having a temperature which is reduced by a mechanical refrigeration means or by injection of dry ice.

7. A method for producing flaky meat from meat pieces, said method comprising the successive steps of:

drying individually the meat pieces by applying to them a stream of cold air at a temperature included between $-10°$ C. and $-30°$ C., intensely cooling the previously dried pieces by placing them in an atmosphere brought to a temperature included between $-25°$ C. to $-45°$ C. generated either by the injection of dry ice or by a mechanical type refrigeration system, thermally stabilizing the previously cooled meat pieces for spreading into the meat pieces the cold which is initially concentrated on the perimeter thereof, until the overall temperature thereof settles at between $-0.5°$ C. and $1.5°$ C., forming meat loaves by compression-forming the cooled meat pieces, and cutting the loaves into extra-thin slices which, once they have been cut, are led, by means of a transporter, to a flaky meat forming station.

8. The method as claimed in claim 7, wherein the transfer to the forming station and the forming operation are conducted in a vacuum.

9. The method as claimed in claim 8, wherein said transfer and forming operations use at least one endless screw heated by induction.

10. The method according to claim 7, wherein the extra-thin slices are sprayed with an appropriate binder before being led to said flaky meat forming station.

11. An installation for preparing meat loaves from meat pieces, said installation comprising:

a peeling station comprising peeling means and a cutting station provided with cutting means respectively for peeling and cutting the pieces of meat supplied by a first conveyor belt, a tunnel in which a second belt conveyor circulates, said tunnel successively comprising a drying station provided with drying means, an intense cooling station provided with cooling means and a temperature stabilizing station, this second belt conveyor receiving the pieces of meat produced at the cutting station, a third belt conveyor receiving the cooled meat pieces from said tunnel and which circulates in an atmosphere of carbon anhydride for bringing the meat pieces into a meat loaf forming mould.

12. The installation as claimed in claim 11, further comprising a detector for detecting metal bodies in a meat piece transported by the conveyor.

13. The installation as claimed in claim 11, wherein the drying station comprises a means of forced circulation of a gas at a temperature of $-10°$ C. to $-30°$ C. and a recycling means equipped with a de-icing battery comprising two heat exchangers operating alternately.

14. The installation as claimed in claim 11, wherein said second belt conveyor is a conveyor with an open-worked belt.

15. The installation as claimed in claim 11, further comprising a station for cutting meat loaves into extra-thin slices, and a vacuum compacter using at least one or two endless screws.

16. The installation as claimed in claim 15, wherein said screw is heated by induction.

* * * * *